United States Patent [19]

Mazzaroppi

[11] Patent Number: 4,806,133
[45] Date of Patent: Feb. 21, 1989

[54] PROCESS AND APPARATUS FOR BENDING AND TEMPERING GLASS SHEETS

[75] Inventor: Giuseppe Mazzaroppi, Aprilia, Italy
[73] Assignee: Mazzaroppi S.r.l., Italy
[21] Appl. No.: 135,444
[22] Filed: Dec. 18, 1987
[30] Foreign Application Priority Data Dec. 31, 1986 [IT] Italy ................. 48799 A/86

[51] Int. Cl.⁴ .......................... C03B 23/025
[52] U.S. Cl. .................... 65/107; 65/273; 65/287; 65/290
[58] Field of Search ............ 65/106, 107, 273, 287, 65/290, 291

[56] References Cited

U.S. PATENT DOCUMENTS 2,886,922  5/1959  Yando, Jr. ................. 65/273 X
3,177,060  4/1965  Pedersen .................... 65/273 X
3,782,916  1/1974  Powell et al. ............... 65/273 X Primary Examiner—Arthur Kellogg
Attorney, Agent, or Firm—Mason, Fenwick & Lawrence

[57] ABSTRACT

Process for bending and tempering glass sheets wherein the sheet (16) is heated up to its plastic state, and it bends by effect of gravity resting on a skelet-type mold (14), and next it is tempered by sudden cooling, in which process during the bending stage the glass sheet (16) is tilted with respect to the vertical direction by an angle of less than 90°. Apparatus for carrying out said process, comprising a heating chamber (1) and a cooling chamber arranged in a sequence and assembled on a rotatable cylindrical frame whose axis is horizontal, said chambers being tiltable through rotation of the frame.

12 Claims, 5 Drawing Sheets

PROCESS AND APPARATUS FOR BENDING AND TEMPERING GLASS SHEETS

The present invention relates to a process for bending and tempering glass sheets and to the apparatus employed. More particularly, the invention relates to a bending and tempering process of the socalled "skelet" or gravity type, wherein the bending operation is carried out with the sheet at a slope with respect to the vertical direction, preferably employing a new orientable apparatus.

Two different types of processes exist at present for bending and tempering glass sheets: the two-step processes, wherein both heating and bending are performed in one step only, which is immediately followed by cooling tempering, and the three-step processes, wherein the glass sheet is first heated, then drawn out of the heating chamber, shaped and finally cooled for tempering.

Two different techniques are provided for the three-step process. The first technique makes use of a press for molding the sheet, with a punch and die system, and it operates on a glass sheet supported in the vertical position by means of pliers or clamps. The second technique, which is more recent, provides the heating of the glass sheet arranged horizontally and movable on a bed of rolls, and it employs, for performing the bending operation, the pressure exerted by an air jet at high temperature from below. Such jet pushes the sheet upwards and presses it against a suitable die. Next, a sudden cooling is realized to perform the tempering.

The first technique disclosed above has nowadays become absolete, since it does not allow to obtain an acceptably regular profile of the bent sheet. Indeed, strains are induced at the edges of the glass sheet, as an effect of the pincers to which it is hung. Moreover, there are some difficulties in the setting of the mold as well as a very high percentage of broken or defective products, which affect both yield and productivity.

As regards the second procedure, which is technologically suitable for a high quality production, it can be considered as limited to large scale production, as plant and operation costs are extremely high.

In the two-step processes the operations are carried out on glass sheets arranged in the horizontal position and supported on suitable molds. Such molds, called "skelets", copy along their perimeters the profile of the glass sheet. The bending phase occurs inside the heating chamber wherein the glass takes on the shape determined by said skelet as an effect of heating and gravity. Once the glass sheet has attained the desired shape and temperature, it is drawn out of the heating chamber and suddenly cooled by means of air jets in order to obtain tempering.

By means of such technique the defects resulting from the presence of the clamps are avoided and a good reproduction is obtained of the bending profile at the points corresponding to the perimeter. However, a sufficient uniformity in the central zone of the glass sheet is not attained, because of the excessive heating that must be necessarily applied. Indeed, in order to obtain the bending of the sheet against the mold by effect of its own weight it is necessary to heat the glass up to the plasticity (or softening) temperature, with the drawback of a higher possibility of deformation and hence the danger of surface defects in the finished product. Moreover, twisting of the sheet may also occur because of the same reason and, on the whole, the size tolerances are scarcely respected.

The technical teaching of the present invention relates to the so-called two-step processes, its object being to avoid the abovementioned drawbacks and, more particularly, the excessive sheet deformation.

According to such teaching a working procedure is provided in which the sheet is kept at a slope during the bending operation. In that way the resultant of the gravity forces (which are equal to the weight of the sheet) distributes over a lower area (which is equal to the orthogonal projection of the sheet on a horizontal plane), and said sheet is pushed downwards by a differently distributed load, with respect to the case with horizontal arrangement. This results in the possibility of working at high temperatures without affecting the quality of the product.

Accordingly, it is possible to produce glass sheets of optimal size tolerances and free from localized deformations of twist.

Thus, the present invention consists in a process for bending and tempering glass sheets wherein the sheet is heated up to plasticity, and it is bent by effect of gravity so as to rest on a skelet-type mold, the sheet being next tempered by sudden cooling, said process being characterized in that during the bending step the glass sheet is at a slope with respect to the vertical direction which is less than 90°.

Preferably, during the heating stage the sheet is first kept approximately in the vertical position and then, once the plastic state is attained, it is tilted for the bending operaiton, and kept at the same slope during the cooling and tempering step. This because sometimes it is preferable not to change the slope of the sheet between the bending and the tempering step so that the passage be as rapid as possible and the sheet be not exposed to the risk of deformation.

The choice of the optimal slope depends on various structural and operative parameters, such as for instance the thickness and the size of the glass sheet, the desired bending profile etc.. Such choice can be effected for instance on the basis of an experimental test on the quality of the final product.

It is also possible to carry out the process according to the present invention by keeping the glass sheet at a slope of less than 90° during the whole process, i.e. since the beginning of the heating stage.

In order to carry into effect the process of the invention an apparatus is suggested, which is made up of a heating and bending chamber and of a cooling and tempering section which are assembled in such a way as to make it possible their setting at various slopes with respect to the vertical direction according to the needs in question.

More particularly, the apparatus for bending and tempering glass sheets according to the present invention is characterized in that it comprises, in a series along a horizontal line, a heating chamber or furnace, and a cooling section, both assembled on a single cylindrical frame with horizontal axis, said frame being rotatable, means for supporting and driving the glass sheets along the apparatus, and means for setting said heating chamber and cooling section at a predetermined slope by means of the rotation of said frame.

Said means for supporting and moving the glass sheets comprise two guide rails, one being placed in an upper position and the other in a lower position, which rails longitudinally cross the apparatus, one or more carriages movable between said rails, mold means of the skelet type supported by said carriages and supporting one or more glass sheets, and means for driving said carriages along said rails. Said last means are made up of, for instance, a chain driving device running above the upper rail, from one end to the other of the apparatus, said device being driven by an electric motor, to which device said carriages are connected when they enter the apparatus.

Said mold means are made up of a skelet-type mold realized with a number of articulated segments hinged to one another along horizontal axes, and movable between an open configuration of the mold and the configuration corresponding to the desired bending profile.

During the working cycle, the skelet-type mold passes from the open configuration, when the glass sheet resting on the same is initially plane, to the final bent configuration, when the glass sheet in the plastic state adheres completely to its inner surface.

Preferably the heating chamber is of the rapid ignition type and is made up of a parallelepipedal structure divided into two symmetrical longitudinal halves facing one another and spaced from one another, such halves being provided with closure means along their perimeters. Such chamber contains electrical resistances as the heating means, and it is completely coated with layers of a suitable insulating material.

According to a preferred embodiment of the invention, the cooling section is of the so-called "organ pipes" type, and it comprises two arrays of horizontal pipes facing one another, having longitudinal lines of nozzles turned towards the zone therebetween, where the glass sheet passes, said pipes being connected by means of hoses to a source of cooling air, which is generally provided by a pair of fans.

Preferably adjustable supporting means are provided for said pipes, so that their arrangement can be changed so as to closely follow the bending profile of the glass sheet placed therebetween.

The two arrays of pipes can be provided with devices capable of keeping them moving during operation, so as to make the cooling action of the sheet much more uniform.

The supporting frame of the apparatus preferably comprises three or more vertical rings made up of steel and connected to each other by longitudinal bars which also are made up of steel. The above-mentioned means for tilting the apparatus are preferably made up of pairs of supporting wheels mounted on horizontal bearings integral with the bedplate of the apparatus. On said wheels the rings of said frame rest in a slidable way. The means for tilting the apparatus also comprise two or more chain driving devices which are driven by and electric motor, each one of them acting on one of the rings.

More particularly, each one of the chain driving devices comprises a chain encircling perimetrically the upper part of the corresponding ring of the frame, which chain is coupled in a fixed way to said ring at a point on its top, and two sprocket wheels with horizontal axes arranged symmetrically on the bedplate of the apparatus, on both sides with respect to said ring. Said chain runs around said sprocket wheels, one of them being connected to said electric motor.

Preferably the driving sprockets of each one of said chain driving devices are assembled on a single horizontal shaft connected to one electric motor.

According to a preferred embodiment of the present invention, said apparatus also comprises a return section of the carriages which is arranged parallel to the main body of said apparatus and spaced apart from the same, and two separate terminal sections. The loading section is close to the inlet of the heating chamber, while the unloading section is arranged near the outlet of the cooling section, each one being assembled on a rotatable cylindrical frame with horizontal axis. Such sections are movable along two straight paths at right angles to the axis of the apparatus, from a position coaxial with said main body to a position aligned with said return section. The whole assembly of the above-mentioned elements makes up an automatic load-unload and return system of carriages wherein the latter, constantly supported by rails, move along an ideally closed path.

It is evident that the apparatus according to the present invention can be employed in an optimal way for carrying out the bending and tempering process in its preferred embodiment, in which the glass sheet enters the heating chamber in a vertical or almost vertical position and next, when the desired temperature has been reached, the whole apparatus tilts by the previously determined angle, rotating about the horizontal axis of the cylindrical frame, and keeps such slope while the sheet goes to the cooling section and is tempered therein.

Anyway, it is to be remarked that the process of the present invention colud also be carried out employing an apparatus different from that suggested above, also not orientable, but constructed in such a way as to make it possible that the glass sheet be maintained within the furnace and the cooling section at a slope of less than 90° with respect to the vertical direction.

The present invention will be now disclosed, for illustrative and not for limitative purposes, according to a preferred embodiment as illustrated in the enclosed drawings, wherein.

Figure 1:
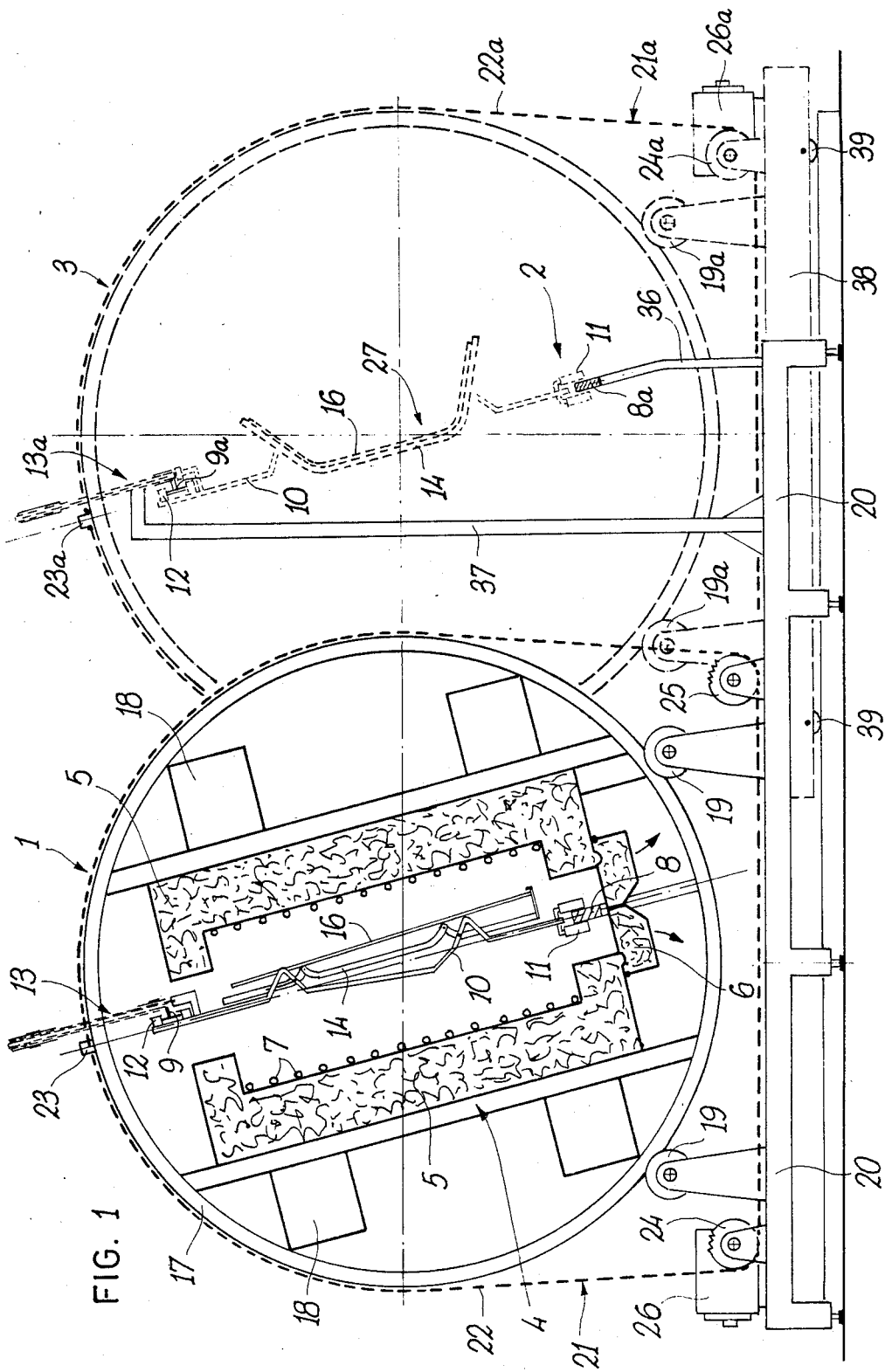
FIG. 1 represents a schematic side elevation view, partially in cross section, of an apparatus according to the present invention in the position taken on during the first heating stage.

FIG. 1 shows schematically a side view of the complete apparatus wherein the main body 1, the return section 2 and the unloading section 3 (in dotted lines) of the carriages are shown. The furnace or heating chamber is designated by the reference numeral 4, such furnace being shown as a partial cross section; the figure shows the longitudinal walls 5 facing one another and the closure member 6, which consists of a two-section door encircling perimetrically the furnace 4 (the upper and the rear parts not shown). The whole assembly is coated with a suitable insulating material.

The figure also shows the electric heating resistances 7, the guiding rails 8 and 9, which are part of the system for supporting and driving the glass sheets, and the carriage 10, which is slidable on the rails 8 and 9 through the rolls 11 and 12. Said carriage 10 is connected to the chain driving system 13, which causes it to move horizontally across the whole apparatus. The articulated mold or skelet 14 is supported by the carriage 10; on said skelet the glass sheet 16 is arranged. FIG. 1 shows the apparatus at the beginning of the heating step when the glass sheet 16 just put into the furnace 4 has a plane surface and the slope of the whole assembly is almost vertical. As can be remarked, such initial shope has been chosen, in the preferred embodiment illustrated, so as to be of 15° with respect to the vertical direction, in order to increase the stability of the skelet-sheet assembly during the shift of the same.

The apparatus is assembled on a cylindrical steel frame comprising essentially the vertical rings 17 in number of three, and the horizontal bars 18, in addition to all other structures allowing the heating chamber 4, the cooling section (not shown), the rails 8 and 9 and all other fittings to be positioned and supported. The rings 17 are slidably resting on two wheels 19 supported on the fixed bedplate 20 of the whole apparatus; the whole cylindrical frame can rotate about its horizontal axis running on the wheels 19, driven by the two chain drives 21, the first one being connected to the first ring 17 while the other one is connected to the third ring (not shown), at the outlet end of the cooling section. It is well evident that the transverse rings and the chain driving devices can vary in number, for instance according to the size of the apparatus.

The chain device 21 is made up of a chain 22 encircling the upper part of the ring 17 and fastened to the same at the point 23, and of two sprocket wheels 24 and 25 arranged on the bedplate 20, said chain 22 running around said sprockets 24 and 25; one of them, which is designated by numeral 24, is connected to the electric motor 26.

Figure 2:
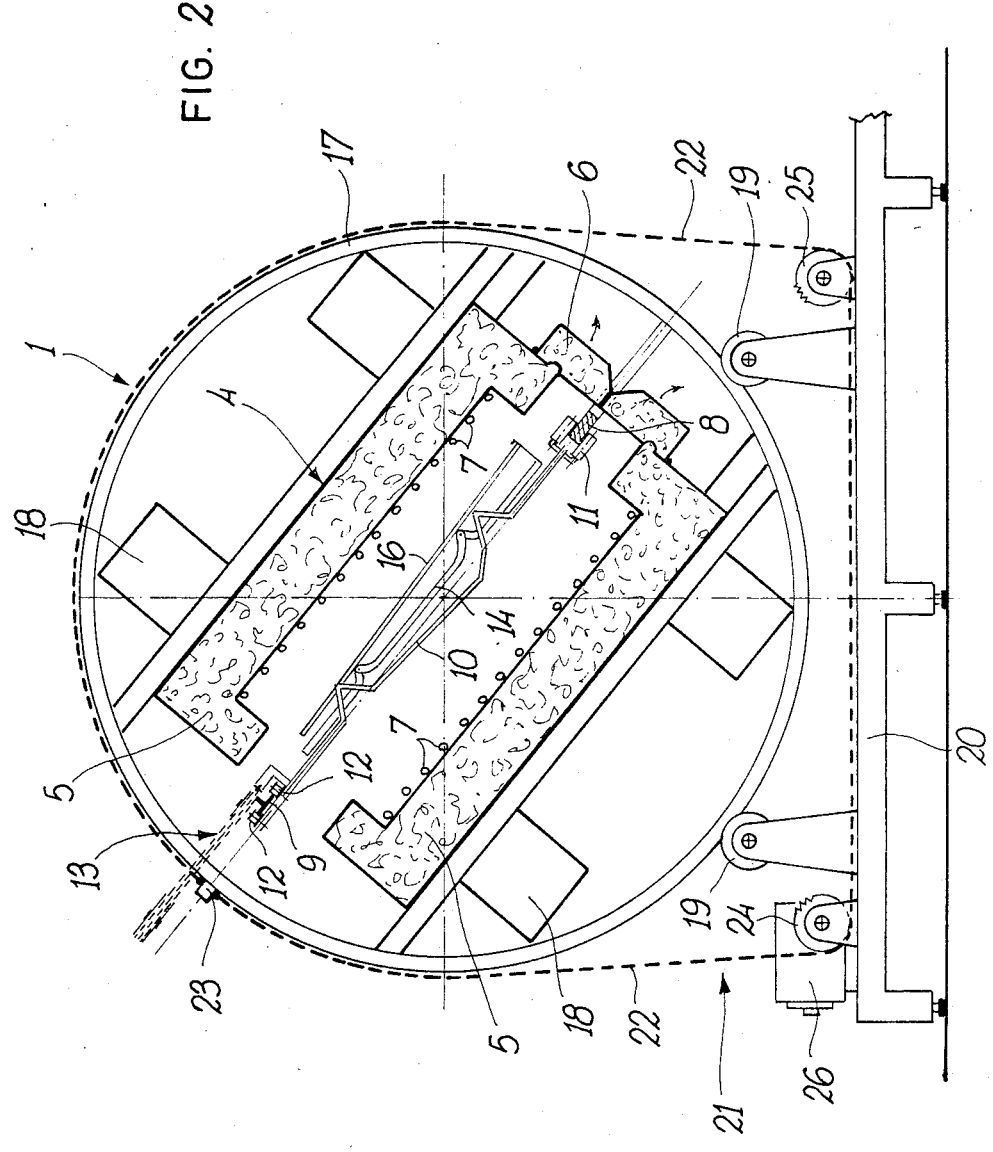
FIG. 2 shows a schematic side view, partially in cross section, of the main body of the apparatus of FIG. 1 at the beginning of the bending stage, with the glass sheet tilted.

By driving the device 21 when the temperature of the glass sheet has reached the desired level, the heating chamber 4 is tilted integrally with the whole main body of the apparatus by the predetermined angle as shown in FIG. 2, and the bending step is started. In FIG. 2, where the elements shown in FIG. 1 are pointed out by corresponding numerals, the slope of the furnace 4 and of the glass sheet 16 with respect to the vertical direction is 50°. As the sheet 16 becomes softened, its profile bends, followed by that of the articulated skelet 14, that passes from the spread or open configuration shown in FIGS. 1 and 2 to the configuration corresponding to the final bending profile shown in dotted lines with numeral 27 in FIG. 1 and with numeral 28 in FIG. 3.

This latter Figure represents a schematic cross section of the cooling section 29 arranged on the cylindrical frame immediately after the heating chamber 4. Only the traces of the two arrays 30 and 31 of the "organ pipes" 32 are shown in said figure, the pipes bearing the nozzles 33, whereas there are not shown the supporting structure system, the supporting frames of the arrays 30 and 31, the means for adjusting the arrangement of the pipes 32. Such means allow the pipes 32 to be shifted as shown in the figure, so as to follow the profile of the whole assembly 28, consisting of the glass sheet 16, of the skelet 14 and of the carriage 10. Also not shown are the means for keeping the two arrays 30 and 31 oscillating during working, such means being possibly made up, for instance of a mechanical device arranged on top of the cylindrical frame, causing the two frames and the two arrays 30 and 31 to move alternately upwards and downwards.

Figure 3:
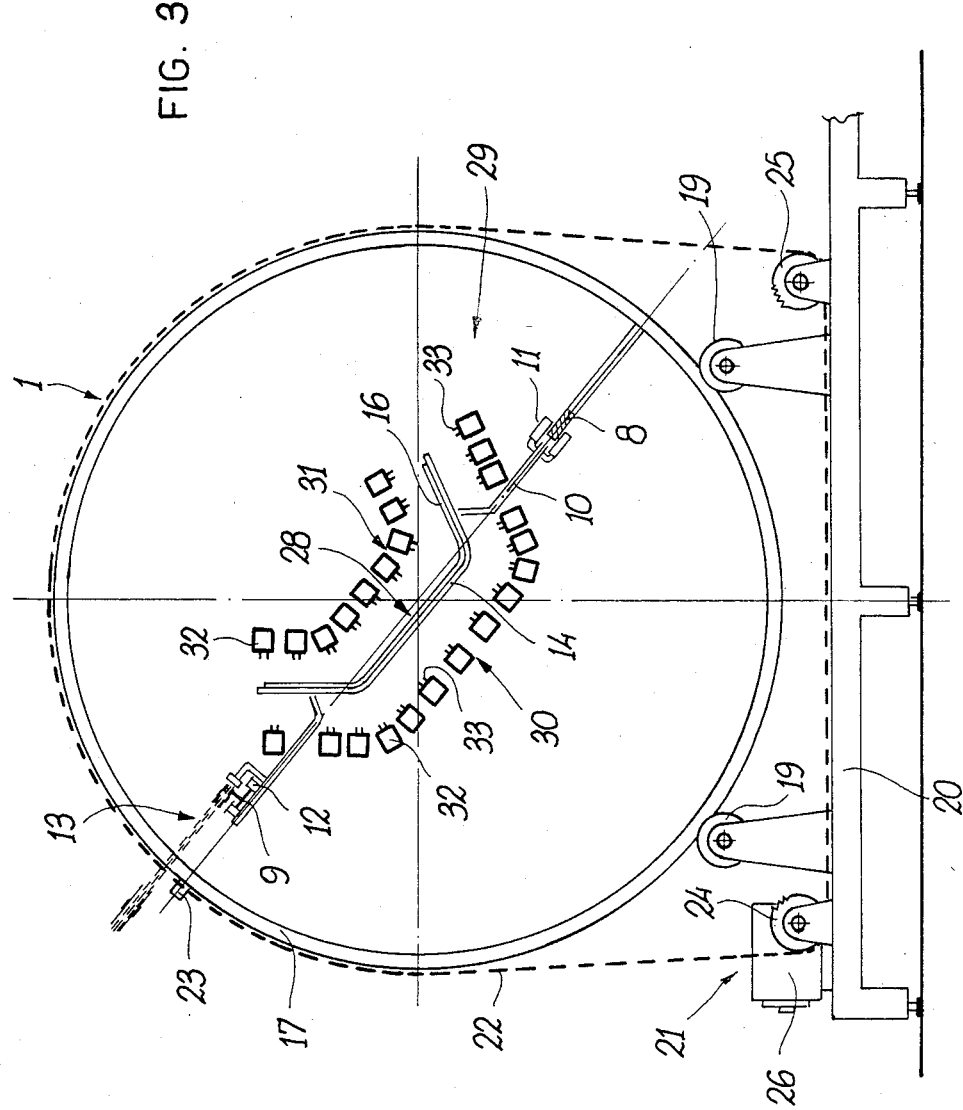
FIG. 3 is a schematic cross sectional view of the cooling section of the apparatus shown in FIG. 1.

FIG. 3 also shows the guiding rails 8 and 9 to which the carriage 10 is connected, and the chain driving system 13 for causing the sheets to move.

The ring 17 at the outlet end of the apparatus is provided with a second chain driving device 21 for causing the apparatus to rotate, said device consisting of elements whose reference numerals correspond to those of the similar elements shown in FIG. 1. The driving sprocket wheel 24 of the second chain device 21 is assembled on the same shaft (34 of FIG. 4) of the sprocket wheel 24 of the first device, which shaft is connected in turn to the motor 26.

The glass sheet 16, just after passing from the furnace 4 to the cooling section 29, undergoes a sudden cooling owing to some air jets which are conveyed by the pipes 32 and by the nozzles 33, so that the sheet is tempered.

Figure 4:
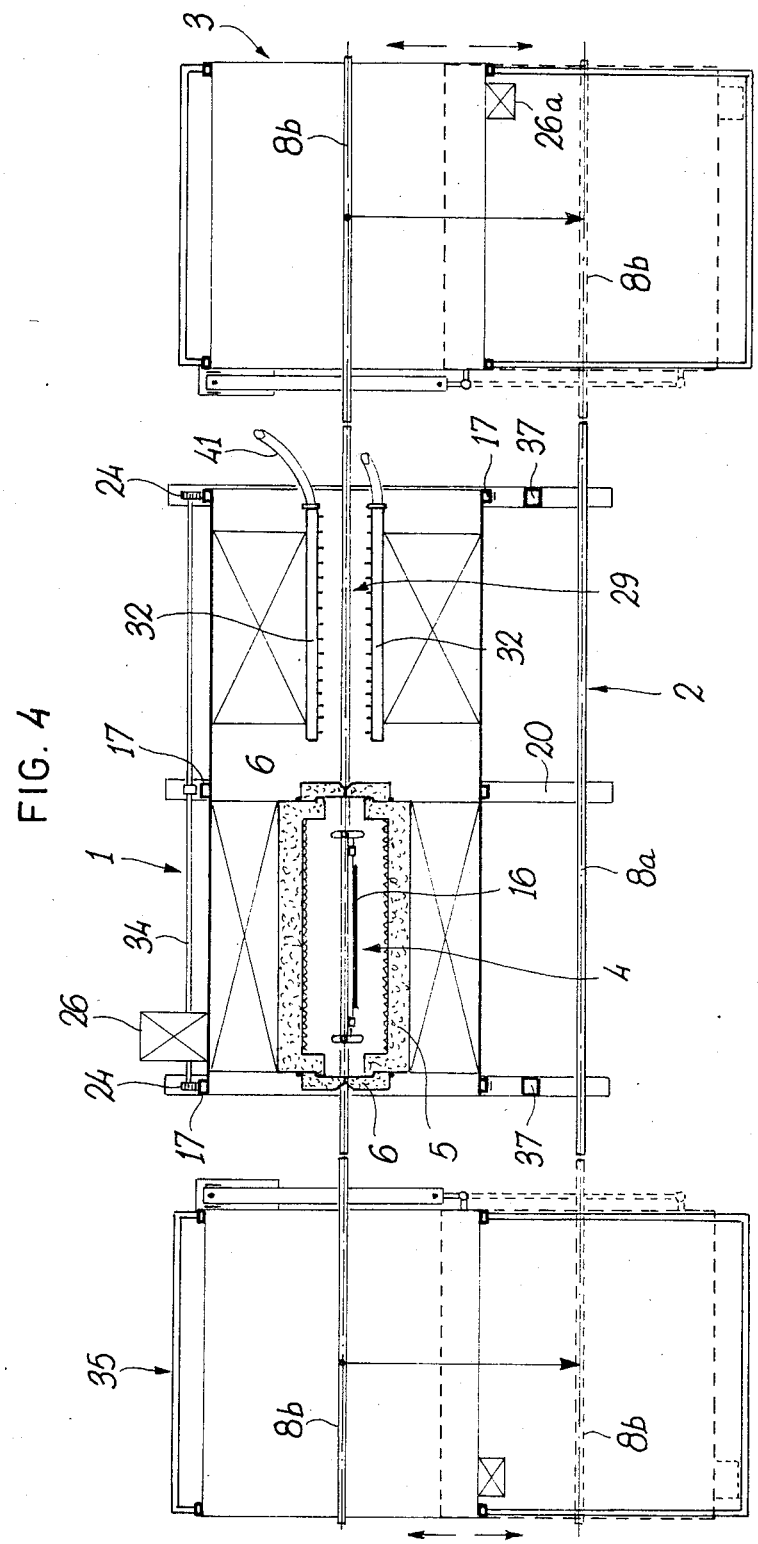
FIG. 4 is a schematic horizontal longitudinal sectional view of the apparatus shown in FIG. 1.

FIG. 4 shows a horizontal sectional view of the whole assembly of the apparatus according to the present invention, wherein, in addition to the main body 1 of the apparatus comprising the furnace 4 and the heating section 29, there are also shown the carriage return section 2, the loading section 35 and the unloading section 3. As shown also in FIG. 1, said return section is merely made up of a pair of rails 8a and 9a similar to the rails 8 and 9 and supported by the upright members 36 and 37, which are fastened to the bedplate 20 of the main body 1, and of a chain driving system 13a similar to 13, which pushes the carriages in the direction opposite to the advancement direction within the apparatus. The slope (15°) in the same as that of the inlet into the furnace.

Figure 5:
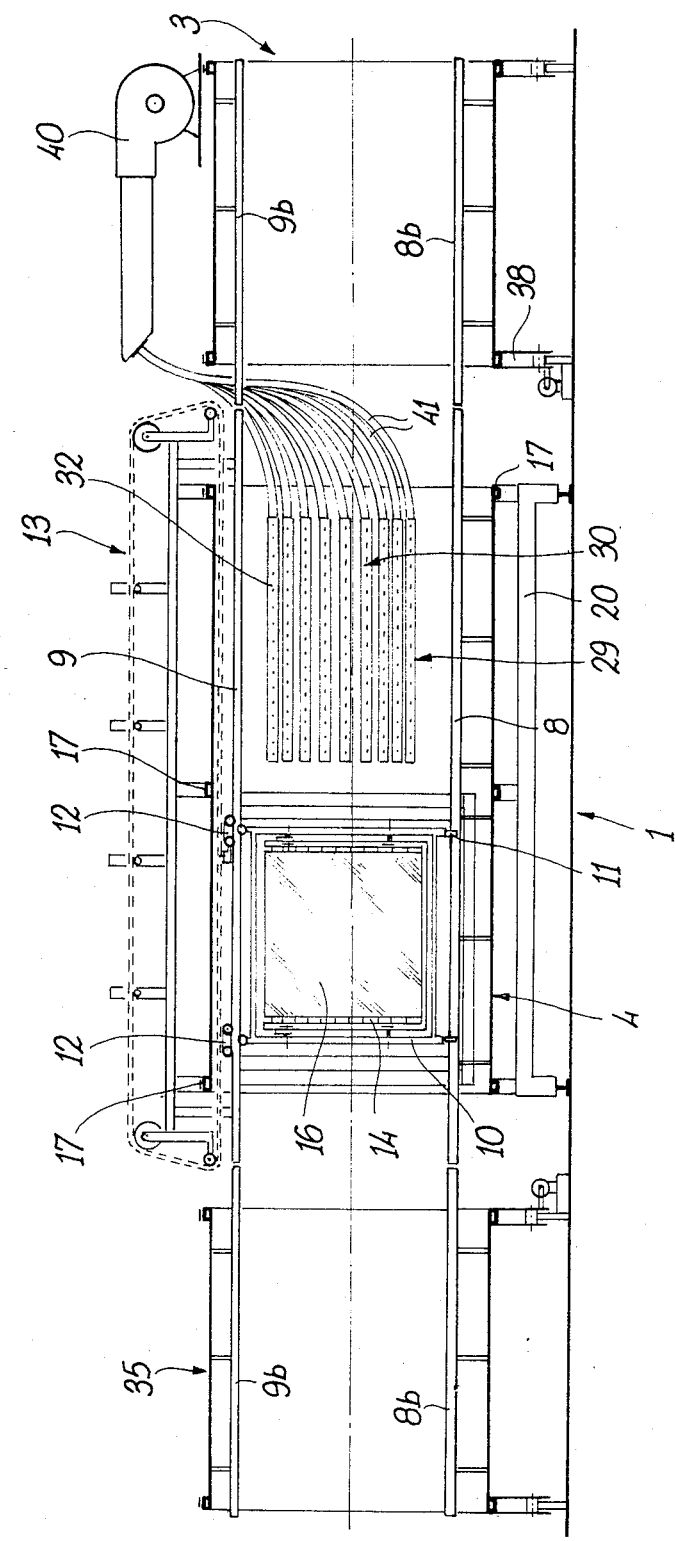
FIG. 5 is a schematic vertical longitudinal sectional view of the same apparatus.

As can be observed in FIGS. 1 and 4 as well as in FIG. 5, which represents a vertical sectional view of the apparatus, the two sections 35 and 3, respectively for loading and unloading, are made up of two cylindrical frames with the rails 8b and 9b, similar to the rails 8, 8a and 9, 9a. Such rails support the carriages during translation from the line of the main apparatus 1 to the line of the return section 2, and vice versa. The two sections 35 and 3 can move along the directions shown by the arrows in FIG. 4 between a position aligned with the return section 2 and a position coaxial with the main body 1 of the apparatus. FIG. 1 clearly shows the bedplate 38 of the unloading section 3, with the wheels 39 for the motion of the same. The two loading and unloading sections 35 and 3 are orientable as they are endowed with means for causing them to tilt through the rotation of the frame, such means being similar to those of the main body 1 of the apparatus. For the unloading section 3 shown in FIG. 1 such means comprise the wheels 19a for supporting the frame and the chain driving system 21a comprising the chain 22a, fastened at the point 23a, the two sprocket wheels 24a and 25a, and the electric motor 26a.

Thus it is possible to tilt the loading and unloading sections according to what is necessary to obtain a perfect alignment of the rails for the passage to or from the main body 1, and to or from the return section 2. The corresponding rail pairs are endowed with clutch locking systems for making such pairs integral.

FIG. 5, wherein the various members are always designated by the same reference numerals, also shows the glass sheet 16 resting on the skelet-type mold 15 within the furnace 4, the organ pipes 32 of one array 30 of the cooling section 29 and the air feeding system which is made up of fans 40 and of hoses 41.

The apparatus disclosed above allows the process of the present invention to be carried out optimally, and such apparatus can also be fitted with a set of control units and timing units and/or thermostats allowing the whole working cycle to be automatically controlled, by driving in addition the carriages, controlling the opening and closing of the furnace doors, the rotation of the main apparatus at a predetermined moment and by a predetermined sloping angle, the activation of the cooling system as well as the rotation and traverse of the two loading and unloading sections.

The present invention has been disclosed with particular reference to some specific embodiments of the same but it is to be understood that modifications and changes can be introduced by those who are skilled in the art without departing from its true spirit and scope.

I claim:

1. A process for bending and tempering a glass sheet wherein the glass sheet is held in an almost vertical position and heated up to the plastic state and as soon as the plastic state is attained, it is tilted toward horizontal from said almost vertical position to a tilted orientation so that it bends by effect of gravity so as to rest on a skelet-type mold, and then it is tempered by sudden cooling, said process being characterized in that during the cooling and tempering stage said sheet is kept at the same tilted orientation.

2. An apparatus for bending and tempering glass sheets, said apparatus comprising, in a sequence along a horizontal line, heating chamber and a cooling section both assembled on a single rotatable cylindrical frame with horizontal axis, means for supporting and driving the glass sheets through the apparatus, and means for tilting the heating chamber and the cooling section through rotation of the frame.

3. An apparatus according to claim 2, wherein said means for supporting and driving the glass sheets comprise upper and lower guide rails, both rails extending longitudinally of said apparatus, one or more carriages which are supported between said rails for movement along said rails, skelet-type mold means supported by said carriages for supporting one or more glass sheets, and means for causing said carriages to move along said rails.

4. An apparatus according to claim 3, wherein said mold means skelet-type molds including a number of articulated segments which are hinged to one another according to horizontal axes and which can move from an open or spread configuration of the mold to the configuration which corresponds to a desired bending profile.

5. An apparatus according to claim 2, wherein said heating chamber is of the rapid ignition type and is made up of a parallelepipedal structure divided into two symmetrical longitudinal halves facing one another and spaced from one another, which halves are also provided with perimetrical closure means, said structure containing electrical resistances as heating means and being fully coated with layers of a suitable insulating material.

6. An apparatus according to claim 2, wherein said cooling section comprises two arrays of horizontal nozzle-bearing pipes facing one another, having longitudinal lines of nozzles turned towards a zone therebetween through which the glass sheet passes, said pipes being connected by means of hoses to an air source for cooling.

7. An apparatus according to claim 6, wherein said nozzle-bearing pipes are fastened to adjustable supporting means for changing their arrangement so as to closely follow the bending profile of the glass sheet placed therebetween.

8. An apparatus according to claim 7, wherein said pipe arrays are provided with devices which are capable of keeping them moving during operation.

9. An apparatus according to claim 2, wherein said cylindrical frame includes three or more vertical steel rings connected to each other by longitudinal steel bars.

10. An apparatus according to claim 9, wherein said means for tilting the apparatus consist of pairs of supporting wheels mounted on horizontal bearings integral with an apparatus bedplate, said frame rings being slidably resting on said wheels, and of two or more chain driving devices actuated by an electric motor, each one driving one of said rings.

11. An apparatus according to claim 10, wherein each one of said chain driving devices comprises a chain encircling perimetrically the upper part of the corresponding ring of the frame and fixedly coupled to said ring at a point on its top, each one of said driving devices also comprising two sprocket wheels having horizontal axes and arranged symmetrically on the bedplate of the apparatus, on both sides with respect to said ring, said chain running around said two sprocket wheels, one of them being connected to said electric motor.

12. An apparatus according to claim 2, which also comprises a return section for said carriages extending parallel to the axis of the main body of said apparatus and spaced apart from the same, and two separate terminal sections, namely a loading section arranged at the inlet of said heating chamber, and an unloading section arranged at the outlet of said cooling section, each of said terminal sections being mounted on a rotatable cylindrical frame and having a horizontal axis and being movable along a straight path at right angles to the axis of the apparatus, from a position coaxial with said main body to a position aligned with said return section.

* * * * *